United States Patent
Max et al.

(10) Patent No.: US 11,325,470 B2
(45) Date of Patent: May 10, 2022

(54) METHOD, DEVICE AND COMPUTER-READABLE STORAGE MEDIUM WITH INSTRUCTIONS FOR CONTROLLING A DISPLAY OF AN AUGMENTED-REALITY HEAD-UP DISPLAY DEVICE FOR A TRANSPORTATION VEHICLE

(71) Applicant: VOLKSWAGEN AKTIENGESELLSCHAFT, Wolfsburg (DE)

(72) Inventors: Stephan Max, Gifhorn (DE); Ulrich Wuttke, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/649,468

(22) PCT Filed: Aug. 28, 2018

(86) PCT No.: PCT/EP2018/073155
§ 371 (c)(1),
(2) Date: Mar. 20, 2020

(87) PCT Pub. No.: WO2019/057452
PCT Pub. Date: Mar. 28, 2019

(65) Prior Publication Data
US 2020/0298703 A1     Sep. 24, 2020

(30) Foreign Application Priority Data
Sep. 21, 2017   (DE) ..................... 10 2017 216 775.0

(51) Int. Cl.
*G06T 7/73*     (2017.01)
*G06T 3/00*     (2006.01)
(Continued)

(52) U.S. Cl.
CPC ............ *B60K 35/00* (2013.01); *G01C 21/365* (2013.01); *G02B 27/0101* (2013.01);
(Continued)

(58) Field of Classification Search
CPC . G06T 7/74; G06T 3/005; G06T 2207/30248; G06T 15/20; G01C 21/365;
(Continued)

(56) References Cited

U.S. PATENT DOCUMENTS

| 6,272,431 B1 | 8/2001 | Zamojdo et al. |
| 7,039,521 B2 | 5/2006 | Hortner et al. |

(Continued)

FOREIGN PATENT DOCUMENTS

| DE | 10138719 A1 | 3/2003 |
| DE | 102010013232 A1 | 11/2011 |

(Continued)

OTHER PUBLICATIONS

Search Report for International Patent Application No. PCT/EP2018/073155; dated Nov. 27, 2018.

*Primary Examiner* — Grace Q Li
(74) *Attorney, Agent, or Firm* — Barnes & Thornburg, LLP (57) ABSTRACT

A method, device, and computer-readable storage medium with instructions for controlling a display of an augmented-reality head-up display device for a transportation vehicle. A position of the transportation vehicle is determined relative to a map; at least one reference point is extracted from the map, the at least one reference point is obtained from an area within a visual range of a driver of the transportation vehicle; transforming the at least one reference point into transportation vehicle coordinates; generating a virtual object for display by the augmented-reality head-up display device, considering the at least one transformed reference (Continued)

point; and outputting the virtual object for display by the augmented-reality head-up display device.

10 Claims, 4 Drawing Sheets

(51) Int. Cl.
  *G06T 11/00* (2006.01)
  *B60K 35/00* (2006.01)
  *G01C 21/36* (2006.01)
  *G02B 27/01* (2006.01)
(52) U.S. Cl.
  CPC ............... *G06T 3/005* (2013.01); *G06T 7/74* (2017.01); *G06T 11/00* (2013.01); *B60K 2370/1529* (2019.05); *B60K 2370/166* (2019.05); *B60K 2370/167* (2019.05); *B60K 2370/177* (2019.05); *B60K 2370/31* (2019.05); *G02B 2027/014* (2013.01); *G06T 2207/30248* (2013.01)
(58) Field of Classification Search
  CPC ........ B60K 2370/177; B60K 2370/166; G02B 2027/014
  See application file for complete search history.

(56) References Cited

U.S. PATENT DOCUMENTS

| | | | |
|---|---|---|---|
| 7,924,146 | B2 | 4/2011 | Seder et al. |
| 10,481,277 | B2 | 11/2019 | Schmid |
| 2009/0290032 | A1 | 11/2009 | Zhang et al. |
| 2013/0194110 | A1 | 8/2013 | Kim et al. |
| 2014/0092236 | A1 | 4/2014 | Findeisen et al. |
| 2016/0153801 | A1 | 6/2016 | Cho et al. |
| 2018/0061129 | A1* | 3/2018 | Sisbot ................... G06T 19/006 |
| 2018/0276989 | A1 | 9/2018 | Braeuchle et al. |
| 2019/0049724 | A1* | 2/2019 | Kimura .............. G06K 9/00671 |
| 2019/0257659 | A1* | 8/2019 | Moteki ..................... G06T 7/73 |

FOREIGN PATENT DOCUMENTS

| | | |
|---|---|---|
| DE | 102011100628 A1 | 11/2012 |
| DE | 102013016921 A1 | 4/2015 |
| DE | 102014219435 A1 | 4/2015 |
| DE | 102014119317 A1 | 6/2016 |
| EP | 3129807 A1 | 2/2017 |
| WO | 2016102304 A1 | 6/2016 |
| WO | 2016110350 A1 | 7/2016 |

* cited by examiner

METHOD, DEVICE AND COMPUTER-READABLE STORAGE MEDIUM WITH INSTRUCTIONS FOR CONTROLLING A DISPLAY OF AN AUGMENTED-REALITY HEAD-UP DISPLAY DEVICE FOR A TRANSPORTATION VEHICLE

PRIORITY CLAIM

This patent application is a U.S. National Phase of International Patent Application No. PCT/EP2018/073155, filed 28 Aug. 2018, which claims priority to German Patent Application No. 10 2017 216 775.0, filed 21 Sep. 2017, the disclosures of which are incorporated herein by reference in their entireties.

SUMMARY

Illustrative embodiments relate to a method, an apparatus and a computer-readable storage medium having instructions for controlling a display by an augmented-reality head-up display apparatus for a transportation vehicle. Illustrative embodiments further relate to a transportation vehicle in which a disclosed method or an exemplary apparatus is used.

BRIEF DESCRIPTION OF THE DRAWINGS

Disclosed embodiments are described below in connection with the figures, in which.

DETAILED DESCRIPTION

With the constant further development of virtual & augmented-reality technologies and augmented-reality applications, these are also finding their way into transportation vehicles. Augmented reality (AR) involves enhancing the real world with virtual elements that are registered at the correct location in three-dimensional space and permit real-time interaction.

One possible technical implementation to enhance the driver's cockpit with virtual augmentations in the correct perspective as appropriate is afforded by head-up displays (HUDs). These involve the beams of light from a display installed in the dashboard being folded via multiple mirrors and lenses and reflected into the eye of the driver via a projection surface, so that the driver sees a virtual image outside the transportation vehicle. The projection surface used in the automotive sector is often the front window, the curved shape of which needs to be taken into consideration for the depiction. As an alternative, an additional pane of glass or plastic is sometimes also used, this being arranged between the driver and the front window on the dashboard. The optical superimposition of the display and the driving scene means that fewer head and eye movements are needed to read the information. Moreover, the adaptation effort for the eyes decreases, since less to no accommodation is required, depending on the virtual distance of the display. Current mass-produced HUDs are restricted to displays directly beneath the primary visual range of the driver, however, and contain redundant information, such as, e.g., the speedometer, which can also be found at another location in the cockpit. Although this display technology reduces instances of the eyes being averted from the road, it continues to have the drawback that the information presented needs to be interpreted and transferred to the real situation, since it is not recorded in the real scene. This can be a mentally demanding cognitive process in complex situations. By marking objects and showing information at its real reference point, i.e., by depiction analogous to contact, it is possible for environment-related information to be depicted directly in the field of vision of the driver. This direct graphical enhancement of the environment, such as augmented reality, can considerably reduce the cognitive transfer requirements.

In this context, DE 10 2010 013 232 A1 discloses a head-up display for a transportation vehicle. The head-up display comprises a display having light-emitting particles or microstructures over a predefined area of the front window that permit a luminescent display. Eye-detection and head-detection devices are used to allow estimation of the eye location and recording of images in the head-up display, so that the images correspond to a view for the user. Map data can be used in this case to determine lane geometries.

Augmented reality affords many kinds of application options for assisting the driver by marking roads and objects in a manner analogous to contact. Relatively obvious examples relate for the most part to the field of navigation. While classic navigation displays in conventional HUDs normally display schematic depictions, e.g., an arrow running at a right angle to the right as an indication that a right turn should be taken at the next opportunity, AR displays provide substantially more effective options. Since the displays can be depicted as "part of the environment", extremely rapid and intuitive interpretations by the user are possible. In modern transportation vehicles, many kinds of data are captured by environment sensors. The aim of current developments is to effectively integrate these data into augmented-reality depictions. An important part of the depiction is data that are placed directly onto the road plane.

Recording of the virtual information in the real field of vision of the driver for augmented-reality purposes makes very great demands on the technical implementation. To be able to depict virtual content at an accurate location and in correct perspective in the reality, very detailed knowledge of the surroundings and proper motion of the transportation vehicle is necessary.

A series of challenges exist in respect of the recording. By way of example, the specific plane in or on which a virtual object is supposed to be depicted is dependent on the orientation of the transportation vehicle. As such, e.g., a service load of the transportation vehicle greatly influences the angle of inclination of the transportation vehicle. Moreover, the road is normally not planar. Depending on the flatness of the surroundings, the surface of the road thus needs to be continually measured. Owing to possible traffic ahead of the transportation vehicle, the road plane may be partially concealed, however, so that it cannot be detected, or can be detected only with difficulty, by the sensor system of the transportation vehicle.

Disclosed embodiments demonstrate improved solutions for controlling a display by an augmented-reality head-up display apparatus.

This is achieved by a method, by a computer-readable storage medium having instructions and by an apparatus.

According to a first disclosed embodiment, a method for controlling a display by an augmented-reality head-up display apparatus for a transportation vehicle comprises:
   determining a pose of the transportation vehicle relative to a map;
   extracting at least one reference point from the map, wherein the at least one reference point originates from a surface in a visual range of a driver of the transportation vehicle;
   transforming the at least one reference point into transportation vehicle coordinates;
   generating a virtual object for display by the augmented-reality head-up display apparatus by taking into consideration the at least one transformed reference point; and
   outputting the virtual object for display by the augmented-reality head-up display apparatus.

According to a further disclosed embodiment, a computer-readable storage medium contains instructions that, when executed by a computer, prompt the computer to carry out the following operation for controlling a display by an augmented-reality head-up display apparatus for a transportation vehicle:
   determining a pose of the transportation vehicle relative to a map;
   extracting at least one reference point from the map, wherein the at least one reference point originates from a surface in a visual range of a driver of the transportation vehicle;
   transforming the at least one reference point into transportation vehicle coordinates;
   generating a virtual object for display by the augmented-reality head-up display apparatus by taking into consideration the at least one transformed reference point; and
   outputting the virtual object for display by the augmented-reality head-up display apparatus.

The term computer should be understood in a broad sense in this context. It also covers controllers and other processor-based data processing apparatuses.

According to a further disclosed embodiment, an apparatus for controlling a display by an augmented-reality head-up display apparatus for a transportation vehicle has:
   a pose determination unit for determining a pose of the transportation vehicle relative to a map;
   an extraction unit for extracting at least one reference point from the map, wherein the at least one reference point originates from a surface in a visual range of a driver of the transportation vehicle;
   a transformation unit for transforming the at least one reference point into transportation vehicle coordinates;
   a graphics unit for generating a virtual object for display by the augmented-reality head-up display apparatus by taking into consideration the at least one transformed reference point; and
   an output for outputting the virtual object for display by the augmented-reality head-up display apparatus.

The disclosed solution uses a highly accurate map containing information about at least a road plane that has been measured previously. This information is used to produce a correct augmented-reality depiction. At the same time, the map is the basis for highly accurate location of the transportation vehicle. The transportation vehicle first of all locates itself in terms of position and orientation relative to the map. From the map data, reference points for the desired depiction plane are then ascertained, for example, ground points. These reference points are transformed into transportation vehicle coordinates and represent the plane in or on which a virtual object is supposed to be depicted. To produce the augmented-reality depiction for the head-up display, the graphics elements of the virtual object are then matched to the profile of the transformed reference points, so that there is the visual impression of the graphics elements lying in the desired plane or standing on the desired plane.

According to at least one disclosed embodiment, the at least one reference point is extracted from a map region in the direction of travel of the transportation vehicle. In this case, the map region may comprise a ground region and an extended region dependent on a velocity of the transportation vehicle. The extraction of a reference point from a map region in the direction of travel of the transportation vehicle ensures that the reference point is reliably in the visual range of the driver. The extended region dependent on the velocity of the transportation vehicle means that it is possible to ensure at higher velocities that there is already a suitable reference point even for a region further away that is reached in a relatively short time on account of the higher velocity.

According to at least one disclosed embodiment, the at least one reference point is calculated from a previously calculated geometric abstraction of a topography that is stored in the map. By way of example, the geometric abstraction of the topography can comprise one-dimensional or two-dimensional polynomials or a grid. To keep the data volume of the map within reasonable limits, it makes sense to store just an approximate description of the topography in the map. Polynomials or a grid are used for such an abstraction. The reference points can then be calculated or interpolated from the data of the map as needed in a simple manner.

According to at least one disclosed embodiment, the surface in the visual range of the driver of the transportation vehicle that originates from the at least one reference point is a ground surface. Normally, the virtual elements are supposed to be perceived as lying or standing on the ground. For this purpose, knowledge of the ground surface is required. Moreover, the ground surface, i.e., normally the road surface, can be detected in advance relatively easy to provide the map data.

According to at least one disclosed embodiment, the generating of the virtual object involves graphical elements of the virtual object being transformed onto the ground surface and distorted. This provides the visual impression that the virtual object, for example, a navigation instruction or a warning, lies directly on the ground.

According to at least one disclosed embodiment, determining the pose of the transportation vehicle relative to the map involves features that have been detected by a sensor system of the transportation vehicle being correlated with features of the map. A transportation vehicle can be located with high accuracy if it is traveling in surroundings or a map that have/has already been measured. In this instance, the features detected by the transportation vehicle are correlated with the already measured features so as to ascertain the position and orientation of the transportation vehicle.

Examples of features that can be used for this are lane markings, other ground markings, roadsides, traffic lights, road signs or landmarks close to the road.

A disclosed method or an exemplary apparatus is used in a vehicle, in particular, a transportation vehicle.

To provide a better understanding of the principles of the disclosure, exemplary embodiments are explained in more detail below with reference to the figures. It goes without saying that the disclosure is not restricted to these embodiments and that the features described can also be combined or modified without departing from the scope of protection as defined in the appended claims.

Figure 1:
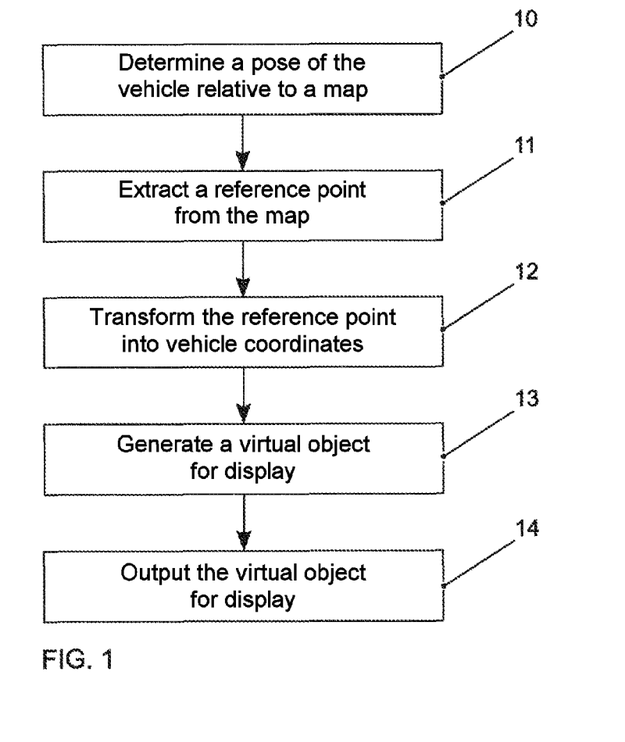
FIG. 1 schematically shows a method for controlling a display by an augmented-reality head-up display apparatus for a transportation vehicle.

FIG. 1 schematically shows a method for controlling a display by an augmented-reality head-up display apparatus for a transportation vehicle. In a first operation, a pose of the transportation vehicle relative to a map is determined 10. For this purpose, features that have been detected by a sensor system of the transportation vehicle can be correlated with features of the map. Subsequently, at least one reference point is extracted from the map 11, the at least one reference point originating from a surface in a visual range of a driver of the transportation vehicle. Optionally, the at least one reference point is extracted from a map region in the direction of travel of the transportation vehicle. The map region in this case can comprise a ground region and an extended region dependent on a velocity of the transportation vehicle. By way of example, the at least one reference point can be calculated from a previously calculated geometric abstraction of a topography stored in the map, e.g., such as one-dimensional or two-dimensional polynomials or a grid. The surface in the visual range of the driver can be, e.g., a ground surface. Following a transformation 12 of the at least one reference point into transportation vehicle coordinates, the at least one transformed reference point is taken into consideration to generate 13 a virtual object for display by the augmented-reality head-up display apparatus. This can involve graphics elements of the virtual object being transformed onto the surface, in particular, a ground surface, and distorted. The virtual object is finally output 14 for display by the augmented-reality head-up display apparatus.

Figure 2:
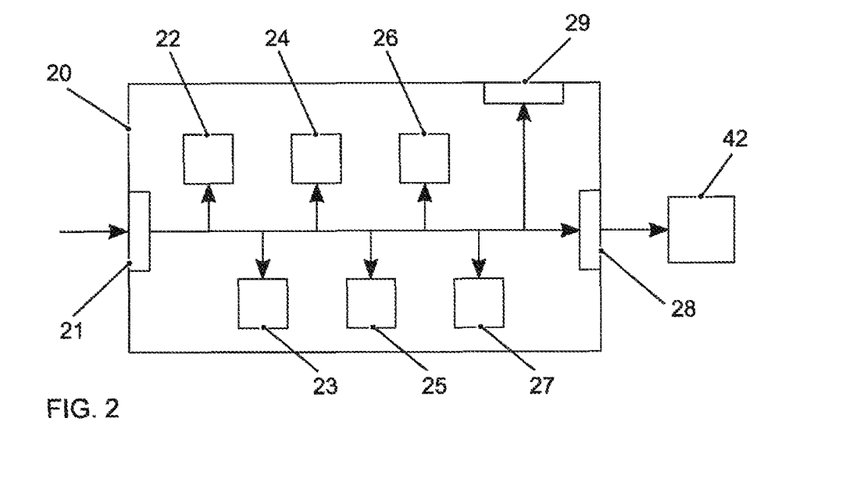
FIG. 2 shows a first embodiment of an apparatus for controlling a display by an augmented-reality head-up display apparatus for a transportation vehicle.

FIG. 2 shows a simplified schematic depiction of a first disclosed embodiment of an apparatus 20 for controlling a display by an augmented-reality head-up display apparatus for a transportation vehicle. The apparatus 20 has an input 21 via which data of a sensor system can be received, e.g., from a front camera of the transportation vehicle or from lidar, radar or ultrasonic sensors. The apparatus 20 moreover has a pose determination unit 22 for determining a pose of the transportation vehicle relative to a map. For this purpose, the pose determination unit 22 can correlate, for example, features that have been detected by a sensor system of the transportation vehicle with features of the map. An extraction unit 23 extracts at least one reference point from the map, the at least one reference point originating from a surface in a visual range of a driver of the transportation vehicle. Optionally, the extraction unit 23 extracts the at least one reference point from a map region in the direction of travel of the transportation vehicle. The map region in this case can comprise a ground region and an extended region dependent on a velocity of the transportation vehicle. By way of example, the at least one reference point can be calculated from a previously calculated geometric abstraction of a topography stored in the map, e.g., such as one-dimensional or two-dimensional polynomials or a grid. The surface in the visual range of the driver can be, e.g., a ground surface. A transformation unit 24 transforms the at least one reference point into transportation vehicle coordinates. A graphics unit 25 then takes into consideration the at least one transformed reference point to generate a virtual object for display by the augmented-reality head-up display apparatus. This can involve the graphics unit 25 transforming graphics elements of the virtual object onto the surface, in particular, a ground surface, and distorting them. An output 28 of the apparatus 20 is used to output the generated virtual object to a controller 42 of the augmented-reality display apparatus. Alternatively, it is also merely possible for an instruction to generate an appropriate virtual object to be output to the controller 42. The controller 42 can then insert the generated virtual object into a display by the augmented-reality head-up display apparatus.

The pose determination unit 22, the extraction unit 23, the transformation unit 24 and the graphics unit 25 can be controlled by a pilot unit 26. A user interface 29 can be used to change settings of the pose determination unit 22, the extraction unit 23, the transformation unit 24, the graphics unit 25 or the pilot unit 26 if need be. The data arising in the apparatus 20 can be stored in a memory 27 of the apparatus 20 as required, for example, for later evaluation or for use by the components of the apparatus 20. The pose determination unit 22, the extraction unit 23, the transformation unit 24, the graphics unit 25 and the pilot unit 26 can be realized as dedicated hardware, for example, as integrated circuits. Naturally, they can also be partially or completely combined or implemented as software that runs on a suitable processor, for example, on a GPU, however. The input 21 and the output 28 can be implemented as separate interfaces or as a combined bidirectional interface. Optionally, the apparatus 20 is integrated in the controller 42 of the augmented-reality head-up display apparatus.

Figure 3:
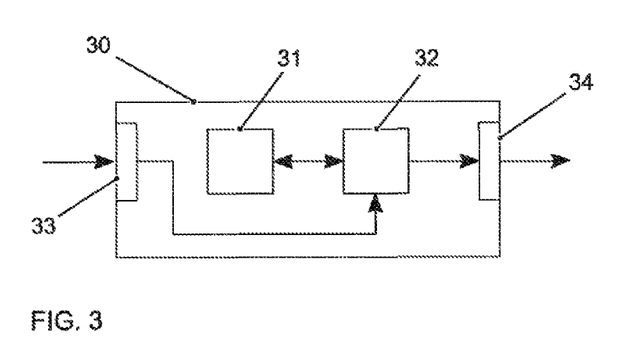
FIG. 3 shows a second embodiment of an apparatus for controlling a display by an augmented-reality head-up display apparatus for a transportation vehicle.

FIG. 3 shows a simplified schematic depiction of a second disclosed embodiment of an apparatus 30 for controlling a display by an augmented-reality head-up display apparatus for a transportation vehicle. The apparatus 30 has a processor 32 and a memory 31. By way of example, the apparatus 30 is a computer or a controller. The memory 31 stores instructions that prompt the apparatus 30, when executed by the processor 32, to carry out the operations according to one of the described methods. The instructions stored in the memory 31 therefore embody a program, executable by the processor 32, that performs the disclosed method. The apparatus 30 has an input 33 for receiving data from a sensor system, e.g., from a front camera of the transportation vehicle or from lidar, radar or ultrasonic sensors. Data generated by the processor 32 are provided via an output 34. Furthermore, they can be stored in the memory 31. The input 33 and the output 34 can be combined to form a bidirectional interface.

The processor 32 can comprise one or more processor units, for example, microprocessors, digital signal processors or combinations of these.

The memories 27, 31 of the disclosed embodiments described can have both volatile and nonvolatile memory areas and comprise a wide variety of memory devices and storage media, for example, hard disks, optical storage media or semiconductor memories.

Figure 4:
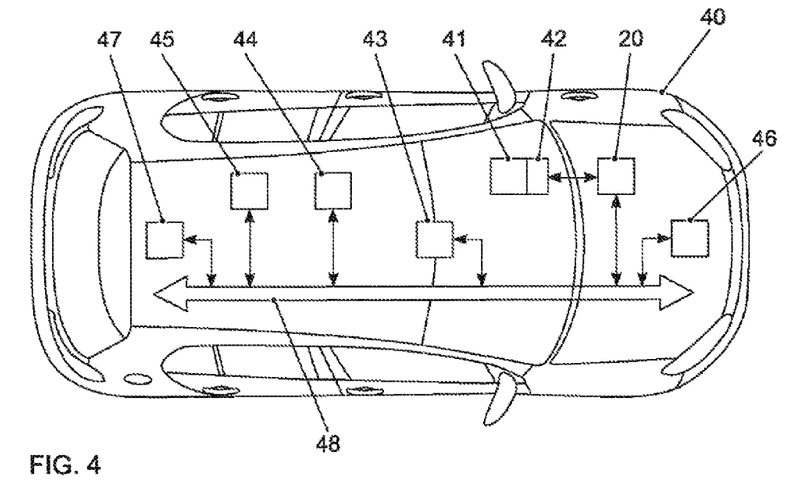
FIG. 4 schematically depicts a transportation vehicle in which a disclosed solution is realized.

FIG. 4 schematically depicts a transportation vehicle 40 in which a disclosed solution is realized. The transportation vehicle 40 has an augmented-reality head-up display apparatus 41 having an associated controller 42. Furthermore, the transportation vehicle 40 has an apparatus 20 for controlling a display by the augmented-reality head-up display apparatus 41. The apparatus 20 may also be integrated in the controller 42 for the augmented-reality head-up display apparatus 41. Further components of the transportation vehicle 40 are a sensor system 43, a navigation system 44, a data transmission unit 45 and a series of assistance systems 46, one of which is depicted in an exemplary state. The data transmission unit 45 can be used to set up a connection to service providers, for example. The sensor system 43, which can comprise a camera and lidar, radar or ultrasonic sensors, for example, can be used to capture, among other things, information pertaining to the road and pertaining to the transportation vehicle surroundings. To store data, there is a memory 47. The data interchange between the different components of the transportation vehicle 40 is effected via a network 48.

Figure 5:
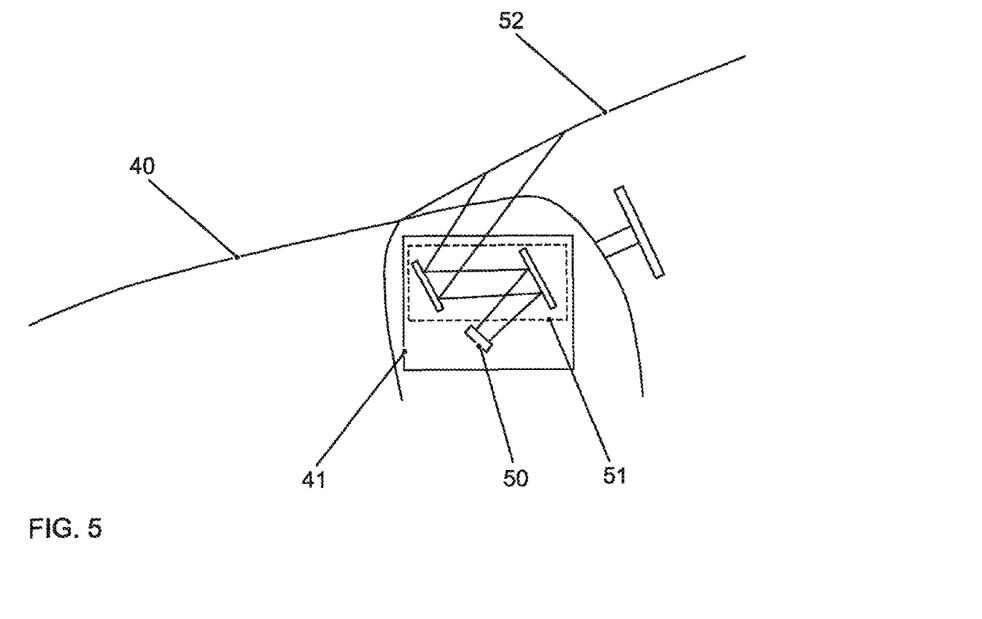
FIG. 5 schematically shows the general design of a head-up display apparatus for a transportation vehicle.

FIG. 5 schematically shows a head-up display apparatus 41 for a transportation vehicle 40, which head-up display apparatus can be used to display content on a projection surface 52 of the transportation vehicle 40, for example, on the front window or on an additional pane of glass or plastic that is arranged between the driver and the front window on the dashboard. The depicted content is generated by an imaging unit 50 and projected onto the projection surface 52 with the aid of an optical module 51. Typically, the projection in this case is produced in a region of the front window above the steering wheel. The imaging unit 50 can be an LCD TFT display, for example. The augmented-reality head-up display apparatus 41 is normally installed in a dashboard of the transportation vehicle 40.

Figure 6:
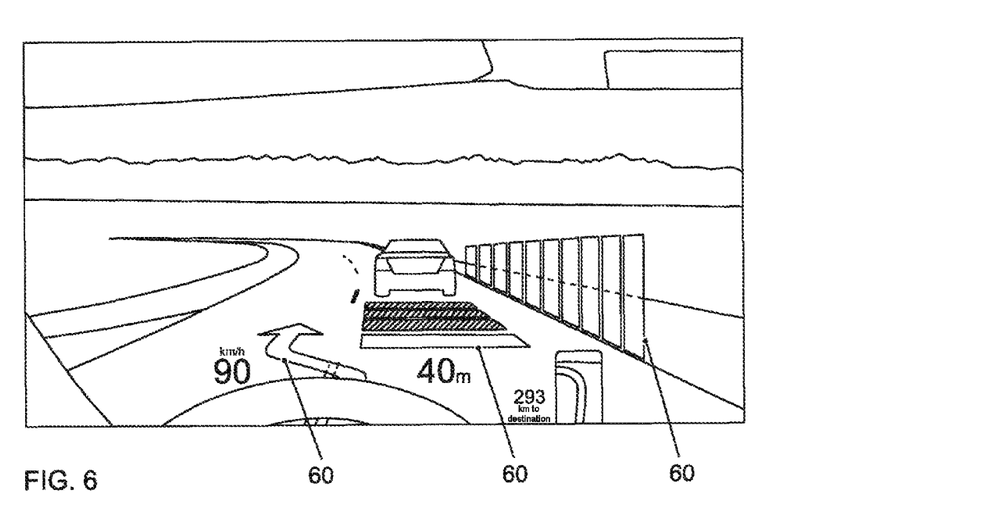
FIG. 6 shows an example of an augmented-reality depiction for a head-up display apparatus.

FIG. 6 shows an example of an augmented-reality depiction by an augmented-reality head-up display apparatus. The actual surroundings have a series of elements superimposed on them. In the example in FIG. 6, these are a current velocity, a distance from a transportation vehicle traveling ahead and navigation information. In addition, a few virtual objects 60 in a depiction analogous to contact can be seen, specifically an information arrow for a possible or imminent overtaking maneuver, a visual depiction of the distance from a transportation vehicle traveling ahead and a "virtual wall" on the right-hand lateral line as safety information. The depicted elements are based predominantly on information that has been captured by transportation vehicle sensors. A person skilled in the art has many different layout options available for the specific layout of the depiction.

Figure 7:
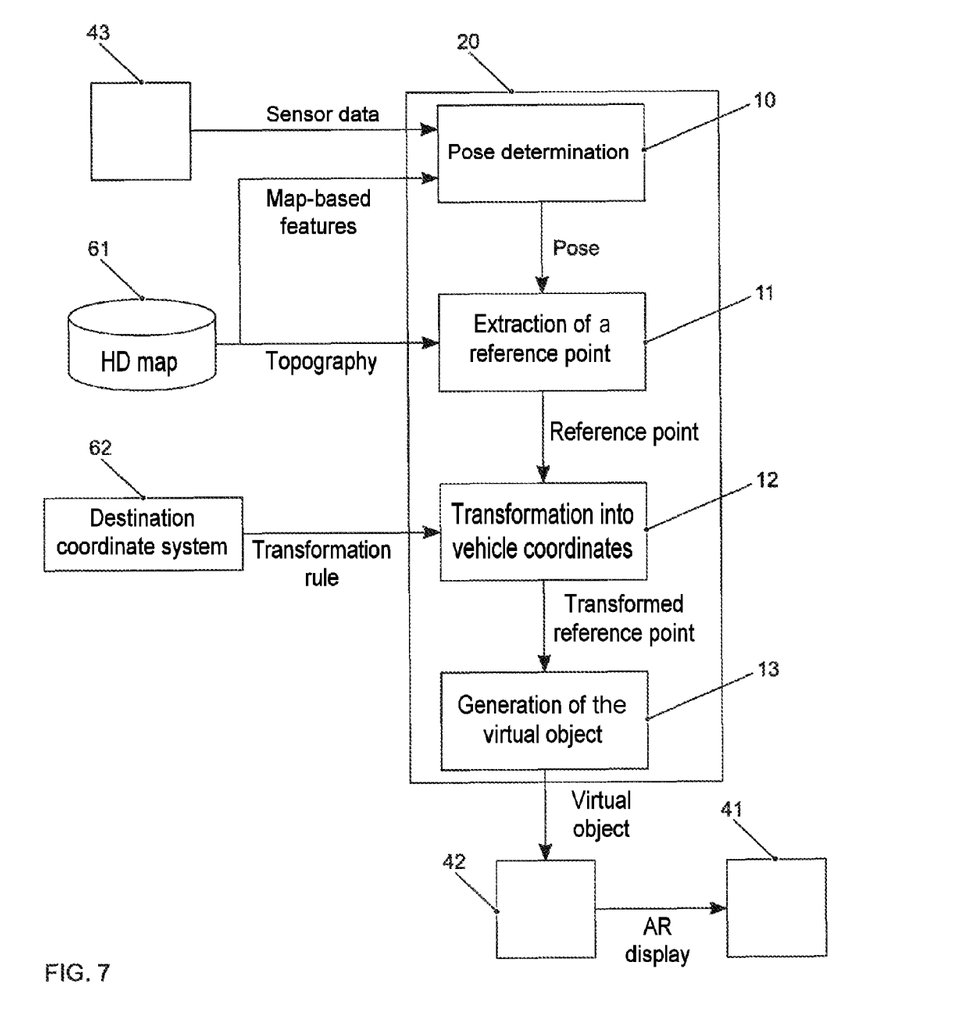
FIG. 7 shows a system design for the disclosed solution for controlling a display by an augmented-reality head-up display apparatus for a transportation vehicle.

FIG. 7 shows a simplified system design of the disclosed solution for controlling a display by an augmented-reality head-up display apparatus 41 for a transportation vehicle. A map 61 is kept in the transportation vehicle, the map containing, among other things, details concerning static features already measured. Examples of static features of this kind are lane markings, other ground markings, roadsides, traffic lights, road signs or landmarks close to the road. The map 61 can be provided by a service provider and may be stored in a memory of the navigation system, for example. The map-based features are transferred to the apparatus 20 for controlling the display by the augmented-reality head-up display apparatus 41 for the region directly ahead of the transportation vehicle. This can be accomplished by using the PSD protocol (PSD: predictive route data), as an example. By correlating static features detected from sensor data from a sensor system 43 with the static features known from the map 61, the pose of the transportation vehicle relative to the map 61 is ascertained 10. At least one reference point is extracted 11 from the map 61 by taking into consideration the pose thus determined. For this purpose, the map contains information concerning the topography, optionally as a geometric abstraction of the topography. The exact position and orientation of the sensor system 43 is subject to manufacturing tolerances and can differ between different transportation vehicles. The sensor system 43 is thus calibrated during production, or its position and orientation are estimated in the course of operation. The resulting parameters are stored in the transportation vehicle. The reference point is thus converted 12 to a transportation vehicle reference coordinate system or target coordinate system 62, e.g., the middle of the front axle, in accordance with the associated transformation rule. As such, all inaccuracies relating to the sensor system 43 are removed. Finally, a virtual object is generated 13 by taking into consideration the transformed reference point, and the virtual object is output to a controller 42 of the augmented-reality head-up display apparatus 41. Alternatively, it is also merely possible for an instruction to generate a corresponding virtual object to be output to the controller 42. The controller 42 can then insert the generated virtual object into a display by the augmented-reality head-up display apparatus 41.

LIST OF REFERENCE SIGNS

10 Determine a pose of the transportation vehicle relative to a map
11 Extract a reference point from the map
12 Transform the reference point into transportation vehicle coordinates
13 Generate a virtual object for display
14 Output the virtual object for display
20 Apparatus
21 Input
22 Pose determination unit
23 Extraction unit
24 Transformation unit
25 Graphics unit
26 Pilot unit
27 Memory
28 Output
29 User interface
30 Apparatus
31 Memory
32 Processor
33 Input
34 Output
40 Transportation vehicle
41 Augmented-reality head-up display apparatus
42 Controller of the augmented-reality head-up display apparatus
43 Sensor system
44 Navigation system
45 Data transmission unit
46 Assistance system
47 Memory
48 Network
50 Imaging unit
51 Optical module
52 Projection surface
60 Virtual object
61 Map data
62 Target coordinate system

The invention claimed is:

1. A method for controlling a display by an augmented-reality head-up display apparatus for a transportation vehicle, the method comprising:
determining a pose of the transportation vehicle relative to a map to ascertain a position and orientation of the transportation vehicle, wherein the pose determination correlates one or more features that have been detected by a sensor system of the transportation vehicle with one or more features of the map, wherein the map includes previously measured road plane data, wherein the map contains information concerning topography, wherein an exact position and orientation of the sensor system of the transportation vehicle is subject to manufacturing tolerances and differs between different transportation vehicles, wherein the sensor system is calibrated during production, or its position and orientation are estimated in the course of operation whereby resulting parameters are stored in the transportation vehicle;

extracting at least one reference point from the map by taking into consideration the determined pose of the transportation vehicle relative to the map, wherein the at least one reference point originates from a ground surface road plane in a visual range of a driver of the transportation vehicle;

transforming the at least one ground surface road plane reference point into transportation vehicle coordinates based on a transportation vehicle reference coordinate system or target coordinate system that is specific to the transportation vehicle, thereby removing inaccuracies relating to the sensor system of the transportation vehicle;

generating a virtual object for display by the augmented-reality head-up display apparatus based at least in part on analysis of the at least one ground surface road plane transformed reference point; and outputting the virtual object for display by the augmented-reality head-up display apparatus, wherein depiction of the virtual object is positioned so as to be placed directly onto the road plane in the augmented-reality head-up display apparatus, wherein the at least one ground surface road plane reference point is extracted using a previously calculated geometric abstraction of a topography that is stored in the map, and wherein the geometric abstraction of the topography comprises one-dimensional or two-dimensional polynomials or a grid.

2. The method of claim 1, wherein the at least one ground surface road plane reference point is extracted from a map region of the map in the direction of travel of the transportation vehicle.

3. The method of claim 2, wherein the map region comprises a ground region and an extended region based on a velocity of the transportation vehicle.

4. The method of claim 1, wherein the generating of the virtual object includes transforming graphical elements of the virtual object onto the ground surface and distorting the graphical elements of the virtual object so as to appear to be placed directly onto the road plane in the augmented-reality head-up display apparatus.

5. A non-transitory computer-readable storage medium having instructions that, when executed by a computer, control the computer to perform a method for controlling a display by an augmented-reality head-up display apparatus for a transportation vehicle, the method comprising:

determining a pose of the transportation vehicle relative to a map to ascertain a position and orientation of the transportation vehicle, wherein the pose determination correlates one or more features that have been detected by a sensor system of the transportation vehicle with one or more features of the map, wherein the map includes previously measured road plane data, wherein the map contains information concerning topography, wherein an exact position and orientation of the sensor system of the transportation vehicle is subject to manufacturing tolerances and differs between different transportation vehicles, wherein the sensor system is calibrated during production, or its position and orientation are estimated in the course of operation whereby resulting parameters are stored in the transportation vehicle;

extracting at least one reference point from the map by taking into consideration the determined pose of the transportation vehicle relative to the map, wherein the at least one reference point originates from a ground surface road plane in a visual range of a driver of the transportation vehicle;

transforming the at least one ground surface road plane reference point into transportation vehicle coordinates based on a transportation vehicle reference coordinate system or target coordinate system that is specific to the transportation vehicle, thereby removing inaccuracies relating to the sensor system of the transportation vehicle generating a virtual object for display by the augmented-reality head-up display apparatus based at least in part on analysis of the at least one ground surface road plane transformed reference point; and outputting the virtual object for display by the augmented-reality head-up display apparatus, wherein depiction of the virtual object is positioned so as to be placed directly onto the road plane in the augmented-reality head-up display apparatus, wherein the at least one ground surface road plane reference point is extracted using a previously calculated geometric abstraction of a topography that is stored in the map, and wherein the geometric abstraction of the topography comprises one-dimensional or two-dimensional polynomials or a grid.

6. An apparatus for controlling a display by an augmented-reality head-up display apparatus for a transportation vehicle, the apparatus comprising:

a pose determination unit configured to determine a pose of the transportation vehicle relative to a map to ascertain a position and orientation of the transportation vehicle, wherein the pose determination correlates one or more features that have been detected by a sensor system of the transportation vehicle with one or more features of the map, wherein the map includes previously measured road plane data, wherein the map contains information concerning topography, wherein an exact position and orientation of the sensor system of the transportation vehicle is subject to manufacturing tolerances and differs between different transportation vehicles, wherein the sensor system is calibrated during production, or its position and orientation are estimated in the course of operation whereby resulting parameters are stored in the transportation vehicle;

an extraction unit configured to extract at least one reference point from the map by taking into consideration the determined pose of the transportation vehicle relative to the map, wherein the at least one reference point originates from a ground surface road plane in a visual range of a driver of the transportation vehicle;

a transformation unit configured to transform the at least one ground surface road plane reference point into transportation vehicle coordinates based on a transportation vehicle reference coordinate system or target coordinate system that is specific to the transportation vehicle, thereby removing inaccuracies relating to the sensor system of the transportation vehicle;

a graphics unit to generate a virtual object for display by the augmented-reality head-up display apparatus based at least in part on analysis of the at least one transformed ground surface road plane reference point; and an output to output the virtual object for display by the augmented-reality head-up display apparatus, wherein depiction of the virtual object is positioned so as to be placed directly onto the road plane in the augmented-reality head-up display apparatus, wherein the at least one ground surface road plane reference point is extracted using a previously calculated geometric abstraction of a topography that is stored in the map, and wherein the geometric abstraction of the topography comprises one-dimensional or two-dimensional polynomials or a grid.

7. A transportation vehicle having an augmented-reality head-up display apparatus, wherein the transportation vehicle comprises the apparatus of claim 6 for controlling a display by the augmented-reality head-up display apparatus.

8. The apparatus of claim 6, wherein the at least one ground surface road plane reference point is extracted from a map region in the direction of travel of the vehicle.

9. The apparatus of claim 8, wherein the map region comprises a ground region and an extended region based on a velocity of the transportation vehicle.

10. The apparatus of claim 6, wherein the generation of the virtual object includes transforming graphical elements of the virtual object onto the ground surface and distorting the graphical elements of the virtual object.

* * * * *